United States Patent
Gunness et al.

(10) Patent No.: US 6,308,583 B1
(45) Date of Patent: Oct. 30, 2001

(54) AXLE FORCE AND MOMENT TRANSDUCER

(75) Inventors: Peter D. Gunness, Waconia; Robin Tuluie, Minneapolis, both of MN (US)

(73) Assignee: MTS Systems Corporation, Eden Prairie, MN (US)

(*) Notice: Subject to any disclaimer, the term of this patent is extended or adjusted under 35 U.S.C. 154(b) by 0 days.

(21) Appl. No.: 09/289,312

(22) Filed: Apr. 9, 1999

Related U.S. Application Data (60) Provisional application No. 60/081,306, filed on Apr. 10, 1998.

(51) Int. Cl.[7] ........................................... G01L 5/16
(52) U.S. Cl. ............................ 73/862.631; 73/11.04; 73/118.1; 73/862.041; 73/862.381; 73/862.636
(58) Field of Search ........................... 73/11.04, 669, 73/788, 794, 796, 798, 818, 819, 855, 856, 118.1, 862, 862.041, 862.042, 862.381, 862.631, 862.636

(56) References Cited

U.S. PATENT DOCUMENTS

| | | | |
|---|---|---|---|
| 3,718,033 | * 2/1973 | Petersen | 73/669 |
| 4,640,138 | 2/1987 | Meyer et al. | 73/862.04 |
| 4,763,531 | 8/1988 | Dietrich et al. | 73/862.04 |
| 4,821,582 | 4/1989 | Meyer et al. | 73/862.04 |
| 5,195,808 | 3/1993 | Johnsen | 303/113.2 |
| 5,265,481 | * 11/1993 | Sonderegger et al. | 73/862.625 |
| 5,602,759 | 2/1997 | Herashima et al. | 364/508 |
| 6,032,520 | * 3/2000 | Miyazaki | 73/118.1 |

* cited by examiner

Primary Examiner—Eric S. McCall
(74) Attorney, Agent, or Firm—Westman, Champlin & Kelly, P.A.

(57) ABSTRACT

A transducer assembly adapted for use for measuring forces and moments including a stationary center load axle having an elongated extend extending along an elongated axis between spaced opposed ends. The transducer assembly including first and second load cells interposed in a force path between opposed first and second ends of the load axle measuring applied load in the suspension load path of a two wheel vehicle.

19 Claims, 9 Drawing Sheets

AXLE FORCE AND MOMENT TRANSDUCER

CROSS REFERENCE TO RELATED APPLICATION

This application claims priority to provisional application Serial No. 60/081,306 filed Apr. 10, 1998 and entitled "AXLE FORCE AND MOMENT TRANSDUCER".

BACKGROUND OF THE INVENTION

This invention relates to a device for measuring forces and moments applied to a wheel axle for analyzing suspension and operating characteristics of a vehicle. In particular, the present invention relates to but is not limited to, a motorcycle force transducer device that is used for designing motorcycles or controlling motorcycle tests based upon measurements of dynamic forces and moments for improving ride and handling.

During operation of a two wheeled vehicle, such as a motorcycle, various forces and moments are imparted to the suspension system or chassis. Measurement of these forces and moments is useful for designing and evaluating performance of such vehicles. For example, axial forces $F_x$, $F_y$ and $F_z$ and roll $M_x$ and steer $M_z$ moments are useful for evaluating performance and handling of two wheel vehicles such as motorcycles during cornering maneuvering, braking and acceleration events to evaluate stress and strain on various chassis locations.

To measure actual operating forces and moments, a vehicle can be adapted with "on-board" measurement equipment which measures operating forces and moments on the suspension system or chassis as an operator drives the vehicle over various terrain and conditions, or alternatively operating conditions can be simulated in a laboratory. In such application, measurement equipment is integrated with the suspension system or frame to measure and analyze loads to the suspension or chassis of the vehicle.

Prior measurement was incorporated into the rotating wheel axle of a two wheeled vehicle or into the vehicle suspension. For example, strain gauges have been incorporated into an inner bore of a wheel axle supported between suspension rods for force measurement. Use of a wheel axle having an inner bore reduces the strength of the wheel axle. Additionally, incorporation of measurement equipment into a rotating wheel axle requires the use of slip rings or other devices for measurement and requires a complex transformation from a rotating wheel coordinate system to a fixed vehicle coordinate system. Incorporation of measurement equipment into the suspension can provide large cross-coupling and complications due to suspension geometry.

SUMMARY OF THE INVENTION

The present invention relates to a load transducer for measuring axle force and moments applied in a suspension load path of a two-wheeled vehicle. The present invention can be adapted for "on-board" data collection for "on-road" testing. The load transducer of the present invention includes first and second load cells coupled to opposed ends of a center load axle which supports a rotating wheel hub.

In application, the center load axle and first and second load cells are interposed in the suspension load path between a rotating wheel, load axle and suspension members of the suspension. Force is supplied to the load axle and is transferred to the suspension members through the load cells. Load cells measure reactive loads supplied to the load axle in the suspension path for analyzing operating and maneuvering performance of a two wheel vehicle without slip rings or other such devices nor complex transformations.

BRIEF DESCRIPTION OF THE DRAWINGS

FIG. 3-1 illustrates calculation of a roll moment.

FIG. 4-1 illustrates calculation of a steer moment.

DETAILED DESCRIPTION OF THE PREFERRED EMBODIMENTS

Figure 1:
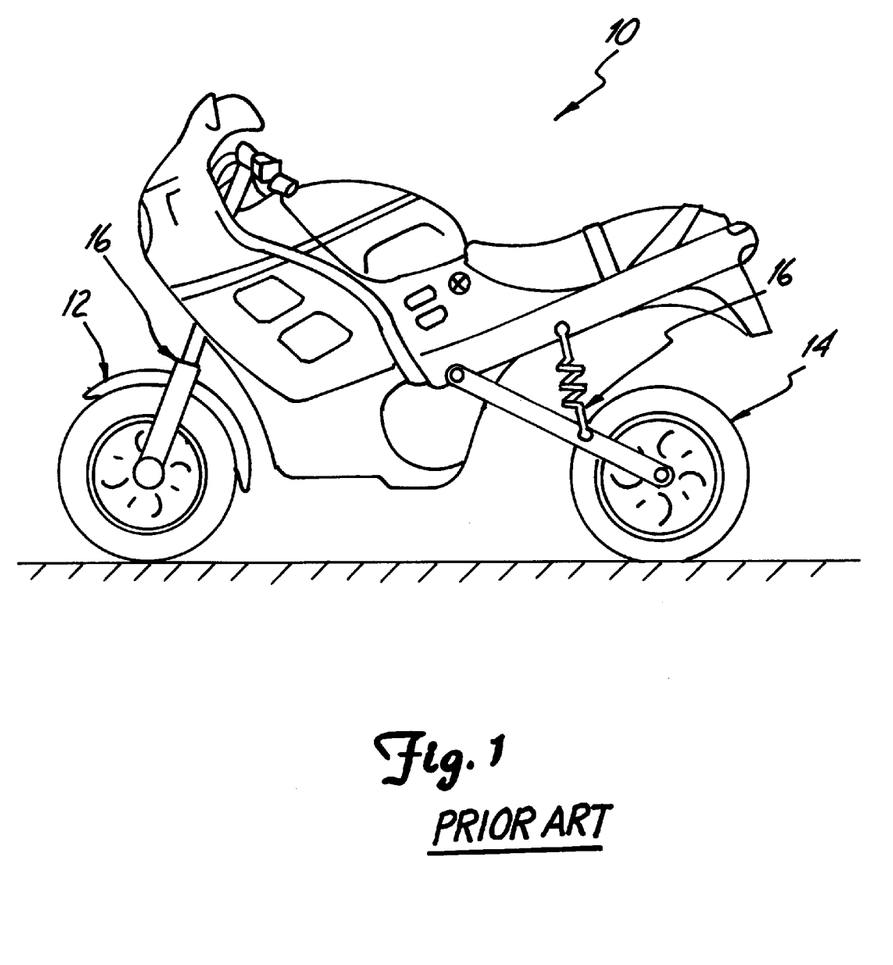
FIG. 1 is a perspective view of a motorcycle in which the present invention can be adapted for measuring operating forces and moments.

FIG. 1 is a side elevational view of a motorcycle 10 including front and rear wheel assemblies 12, 14 having a wheel supported by a rotating axle (not shown) coupled to suspension members 16. During operation, various forces and moments are applied to a suspension and chassis of the vehicle through the wheels. Measurement and analysis of forces and moments on the vehicle suspension and chassis is useful for design and performance evaluation.

Figure 2:
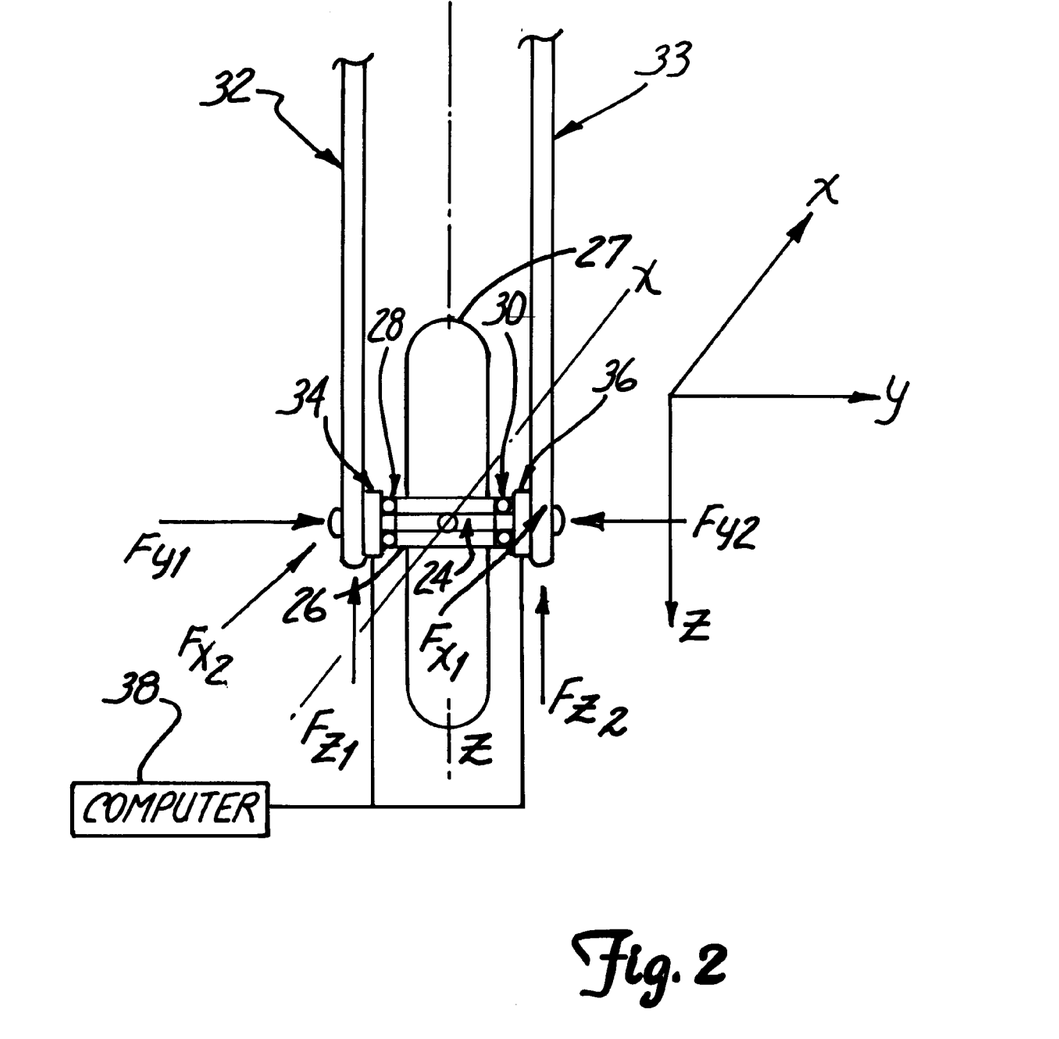
FIG. 2 illustrates a front elevational view of an embodiment of a transducer assembly of the present invention.

FIG. 2 is a front elevational view of an embodiment of a transducer assembly of the present invention which can be incorporated into a two wheel vehicle for test application and analysis. As shown, the transducer assembly includes a stationary rod or load axle 24 and a wheel hub 26 supporting wheel 27 for rotation. The stationary rod 24 and wheel hub 26 are rotationally coupled via bearings 28, 30 to form a wheel assembly. Stationary rod 24 is fixedly coupled to a frame of a vehicle (not shown) via fork rods or suspension members 32, 33. During use of the vehicle, forces are applied through wheel hub 26 from wheel 27 to stationary rod or load axle 24. The transducer assembly of the present invention includes spaced dual triaxial load cells 34 and 36 enclosed in individual housings coupled to rod 24 at spaced locations for measuring operating forces acting on the stationary rod 24 for analysis of operating dynamics and stress for various operating characteristics such as, cornering and steering.

FIG. 2 illustrates the transducer assembly superimposed with a Cartesian x-y-z coordinate system. The dual spaced triaxial load cells 34, 36 are coupled to the stationary rod or load axle 24 in the suspension load path to measure triaxial loads $F_x$, $F_y$ and $F_z$. Output measurements from the load cells 34, 36 are coupled to a computer 38 for calculation of $F_x$, $F_y$ and $F_z$ for analysis. Process data may also be stored by the computer 38. As shown, the resultant $F_x$ force to the frame is provided by $F_{x1}+F_{x2}$; the resultant $F_y$ force is provided by $F_{y1}-F_{y2}$ and the resultant $F_z$ force is provided by $F_{z1}+F_{z2}$.

Figure 3:
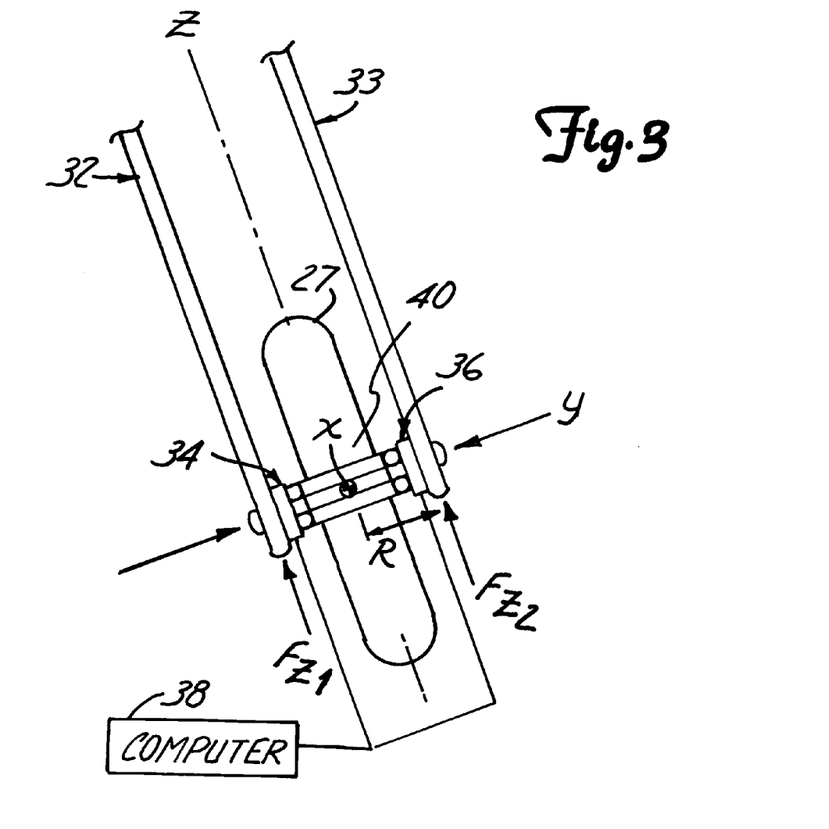
FIG. 3 is a front elevational view illustrating a cornering or roll event.

The transducer assembly of the present invention has particular application for a motorcycle. Motorcycles roll, as illustrated in FIG. 3, relative to the x axis during cornering, or other maneuvering events. FIG. 3 is a front elevational view of the transducer assembly rolling about x axis. As shown in FIG. 3, triaxial load cells 34, 36 are used to measure the forces and moment transmitted to the motorcycle suspension and chassis during the cornering event. Transducer assembly is relatively symmetric about a center point 40 (center of stationary rod 24) and has a relatively balanced mass about point 40. Load cells 34, 36 are supported via stationary rod 24 on opposed side of point 40 equal distance from point 40 to measure forces at the wheel axle in the suspension load path at pivot point 40 without complex coordinate transformation.

Figure 31:
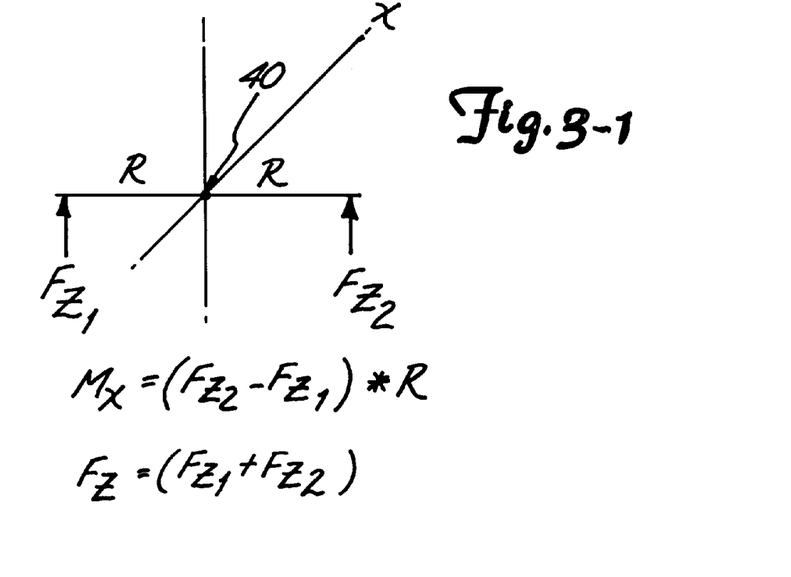

The roll moment about the x axis is calculated based upon differential $F_z$ force measured by load cells 34, 36 times R, the distance from the center point 40 to load cells 34, 36 which is the same for load cells 34, 36 since load cells 34, 36 are equally spaced from center point 40. Thus, as shown, load cell 34 measures $F_{z1}$ and load cell 36 measures $F_{z2}$ which is outputted to computer 38 to determine the roll moment or $M_x=(F_{z1}-F_{z2})\times R$ of the wheel assembly as illustrated in FIG. 3-1. If the load cells are not symmetric, a differential moment may be calculated based upon $F_{z1}$ times distance of load cell 34, from point 40 and $F_{z2}$ times the distance of load cell 36 from the point 40.

Figure 4:
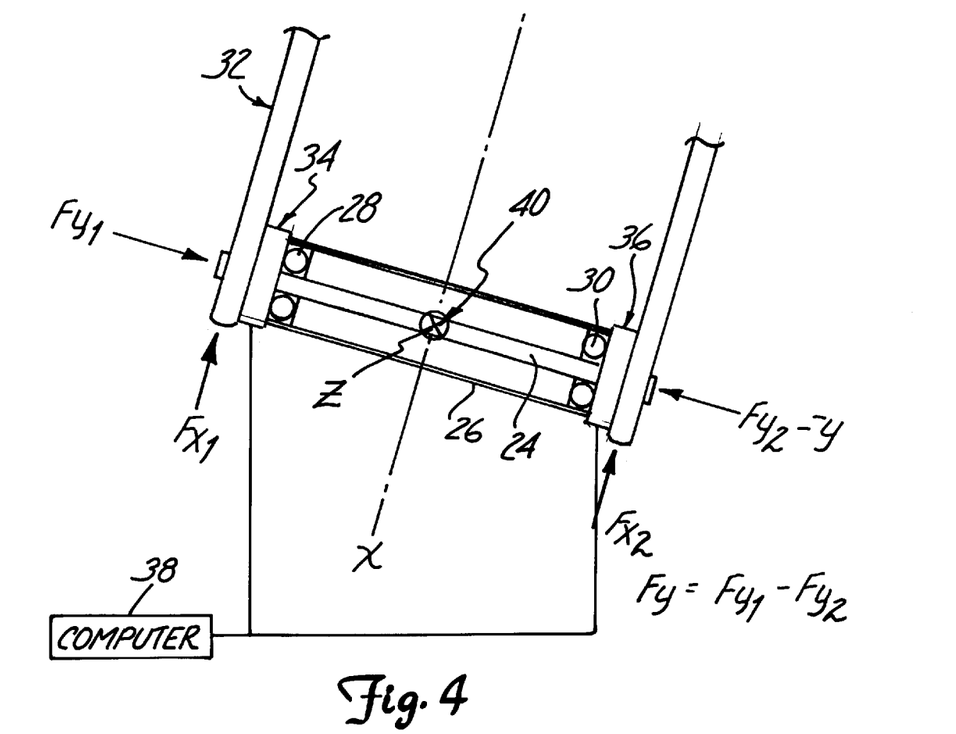
FIG. 4 is a top view illustrating a steer event.
Figure 41:
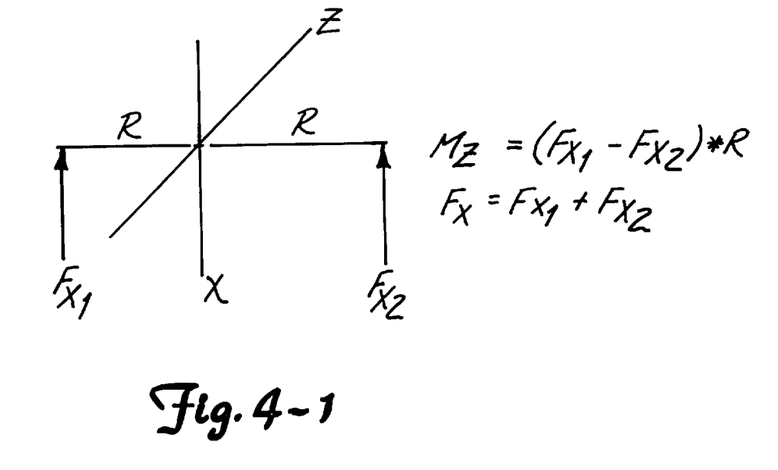

FIG. 4 is a top elevational view showing rotation of the transducer assembly about a z axis for steering. Rotation about z axis or the steer moment is measured based upon $F_{x1}$ and $F_{x2}$ from the load cells 34, 36. Since load cells are symmetric about z axis, the moment is calculated via $M_z=(F_{x2}-F_{x1}) \times R$, where R is the distance from either load cell 34, 36 to point 40 by computer 38, as illustrated in FIG. 4-1.

Figure 5:
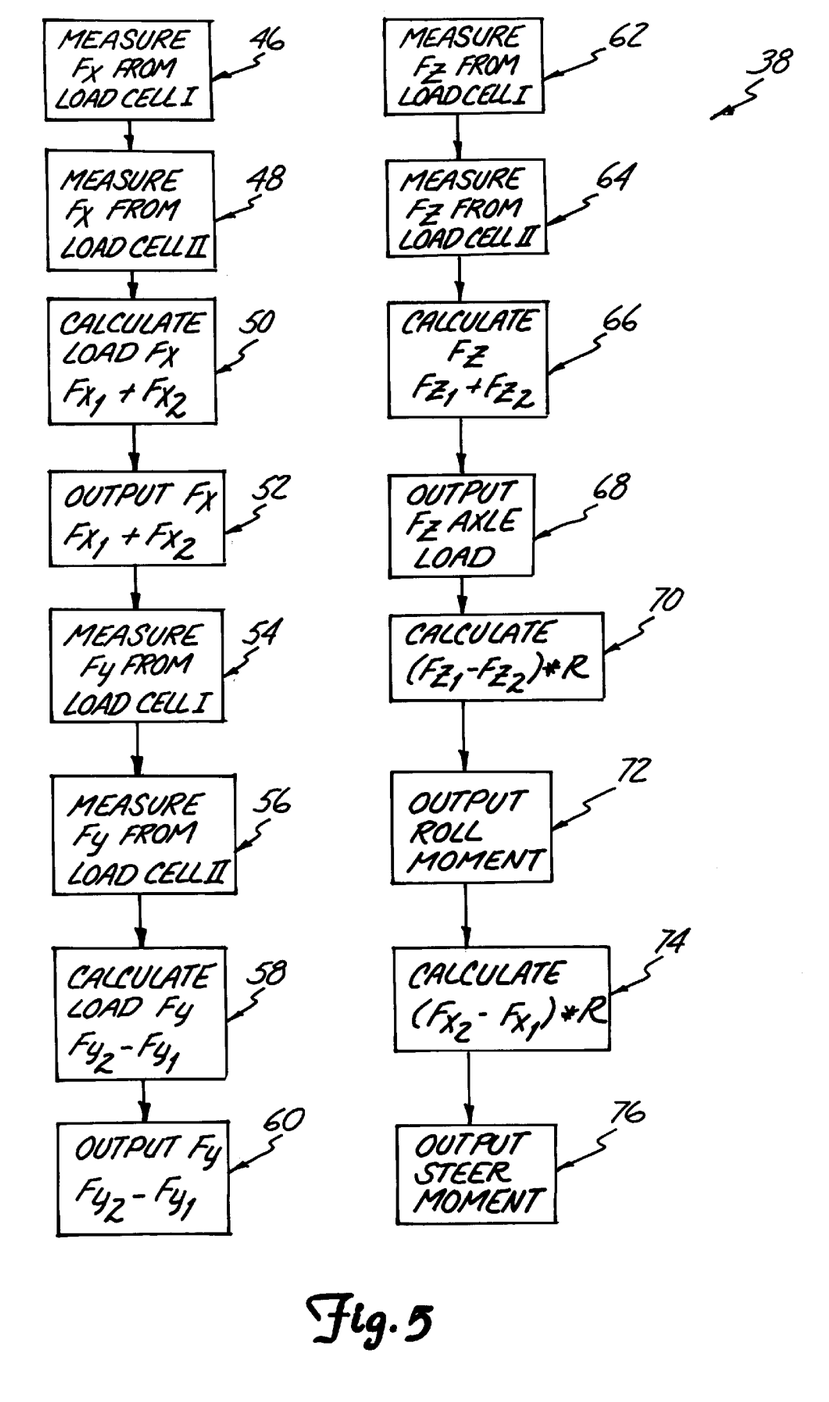
FIG. 5 is a flow chart of operation of an embodiment of a computer coupled to the transducer assembly for calculating operating characteristics.

FIG. 5 is a flow chart diagram of the operation of the computer 38 to measure $F_x$, $F_y$ and $F_z$, and the steer moment and roll moment of a vehicle, e.g. a motorcycle. As illustrated by blocks 46 and 48, the $F_x$ load is measured from load cells 34 and 36. Thereafter, as illustrated by block 50, a resultant force is calculated based upon $(F_{x1}+F_{x2})$, where $F_{x1}$ is the force measured from load cell 34 and $F_{x2}$ is the force measured from load cell 36. The resultant force measurement is outputted or stored as illustrated by block 52.

Similarly, as illustrated by blocks 54, 56, the $F_{y1}$ and $F_{y2}$ force is measured from load cell 34 and load cell 36 to calculate a resultant $F_y$ load as illustrated in block 58 based upon $(F_{y2}-F_{y1})$, where $F_{y1}$ is the $F_y$ force from load cell 34 and $F_{y2}$ is the $F_y$ force from load cell 36. Thereafter, the result in $F_y$ force is outputted or stored as illustrated by block 60. Similarly, the resultant $F_y$ force is calculated by $F_z=F_{z1}+F_{z1}$ as illustrated by blocks 62, 63, 64, 65 and 66, and is outputted or stored as illustrated by block 68.

The computer 38 also calculates the roll and steer moment. The measured $F_{z1}$ and $F_{z2}$ forces from load cells 34 and 36 are used to calculate the roll moment as illustrated by block 70. As previously explained, the roll moment is equivalent to the difference of the forces $F_{z1}$ and $F_{z2}$ times the moment arm which is the distance R of the load cells from point 40. The roll moment is outputted or stored as illustrated by block 72. Similarly, the steer moment is calculated via $F_{x1}$ and $F_{x1}$ force components measured by load cells 34 and 36. A steer moment is calculated based upon the difference between $F_{x2}$ measured by load cell 36 and $F_{x1}$ measured by load cell 34 times the distance R of the load cell from the point 40 as illustrated by block 74. The steer moment is outputted or stored as illustrated by block 76.

Figure 6:
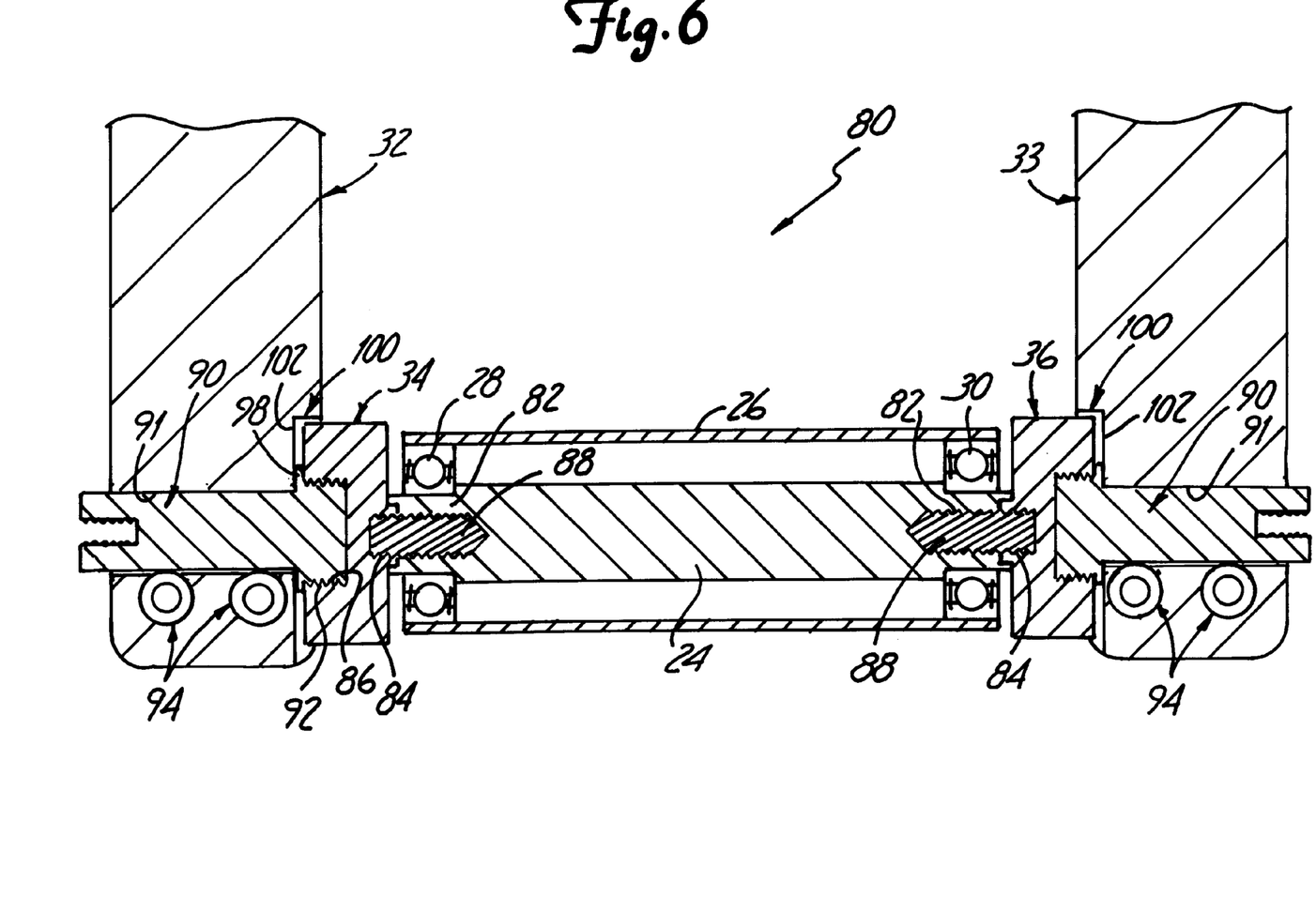
FIG. 6 is a detailed view of an embodiment of a transducer assembly of the present invention.

FIG. 6 is a detailed view of an embodiment of a front motorcycle wheel assembly 80 incorporating the present invention where similar numbers are used to identify similar parts of the wheel assembly shown in FIGS. 2–4. Wheel 27 is not shown in FIG. 6. Stationary rod 24 is formed of an elongated member having an elongated extent extending along an elongated axis. Elongated member includes opposed ends transverse to the elongated axis having threaded bores 82. Bearings 28, 30 rotationally couple wheel hub 26 to an outer circumference of rod 24 between opposed ends of rod 24 for rotationally supporting a wheel (not shown).

Load cells 34, 36 are supported relative to transverse ends of stationary rod 24 at spaced symmetric locations and are interposed in the load path between rod 24 and fork rods or suspension members 32, 33. Load cells 34 and 36 are cylindrically shaped triaxial load cells such as those available from Michigan Scientific Corporation, Charlevoix, Mich. and include triaxial sensing elements enclosed in a housing having opposed threaded bores 84 and 86 (load bases) on opposed first and second housing faces. In the embodiment shown, load cells 34, 36 are interposed between ends of stationary rod 24 and suspension members 32, 33. Load cells 34 and 36 are coupled to rod 24 at opposed ends of rod 24 via a threaded fastener 88 which extends into cooperating threaded bore 84 of rod 24 and threaded bore 86 of load cells 34 and 36. The threaded connection transfers the load from rod 24 to load cells 34 and 36 for measurement. The opposed faces of the load cells 34,36 are coupled to fork rods or suspension members 32, 33 via threaded bore 86 of load cells 34, 36.

Elongated fastener 90 extends through a fastener hole 91 on suspension members 32, 33. Fastener 90 includes an externally threaded end 92 which is secured into threaded bore 86 of load cells 34 and 36 for connecting stationary rod 24 and load cells 34, 36 to the frame. Pinch bolt 94 secures fastener 90 to secure fastener 90 relative to suspension members 32, 33.

The elongated fastener 90 also includes a flange 98 extending about an outer perimeter of fastener 90. Suspension members 32, 33 include a side recess 100. Load cells 34 and 36 extend into recess 100 and the housings of the load cells 34, 36 align with a longitudinal surface 102 of suspension members 32, 33. Flange 98 on fastener 90 is relatively thin and spaces housing faces of load cells 34, 36 from the longitudinal surface 102 to decouple suspension members 32, 33 from axle 24 to transfer load through load cells 34, 36.

Figure 7:
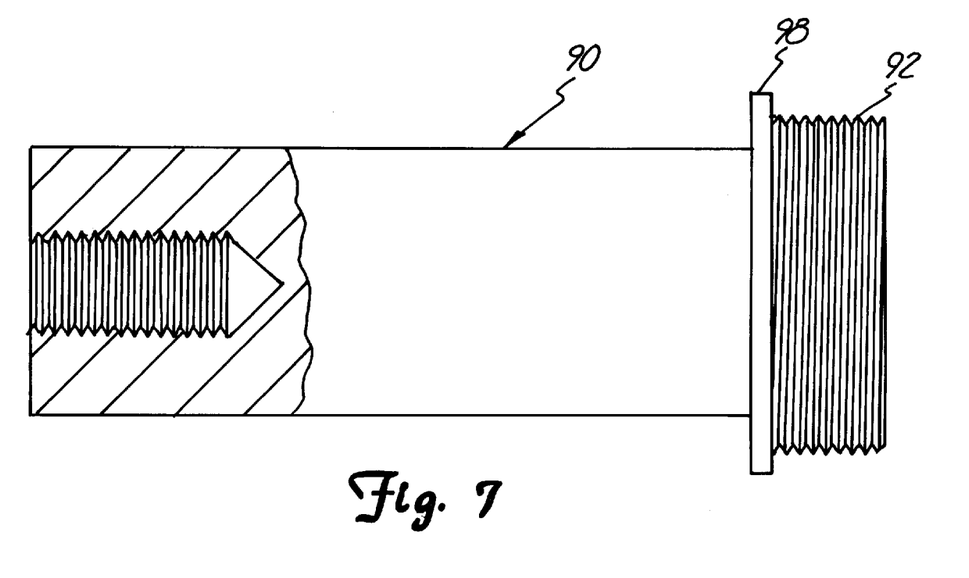
FIG. 7 is a detailed view of a fastener coupling the suspension members to a load cell for measuring operating characteristics.

The force path for all force $F_x$, $F_y$, $F_z$ and moments roll moment ($M_x$) and steer moment ($M_z$) is exclusively from wheel hub 26 through bearings 28, 30, stationary rod 24, fastener 88 into load cells 34, 36, then measured by load cells 34, 36 and then through fastener 90 into suspension members 32, 33 onto the motorcycle or vehicle. Faces of load cells 34, 36 are spaced from surface 102 to limit influence of suspension members 32, 33 (frame) to counteract or balance the moment or force on stationary rod or load axle 24 so that the moment is isolated to the load cells 34, 36 for measurement and transferred to suspension members 32, 33 via fastener 90. The faces of the load cells 34 and 36 are spaced from longitudinal surface 102 via the spacer flange 98 extending about an outer perimeter of fastener 90 which is shown in detail in FIG. 7.

Figure 8:
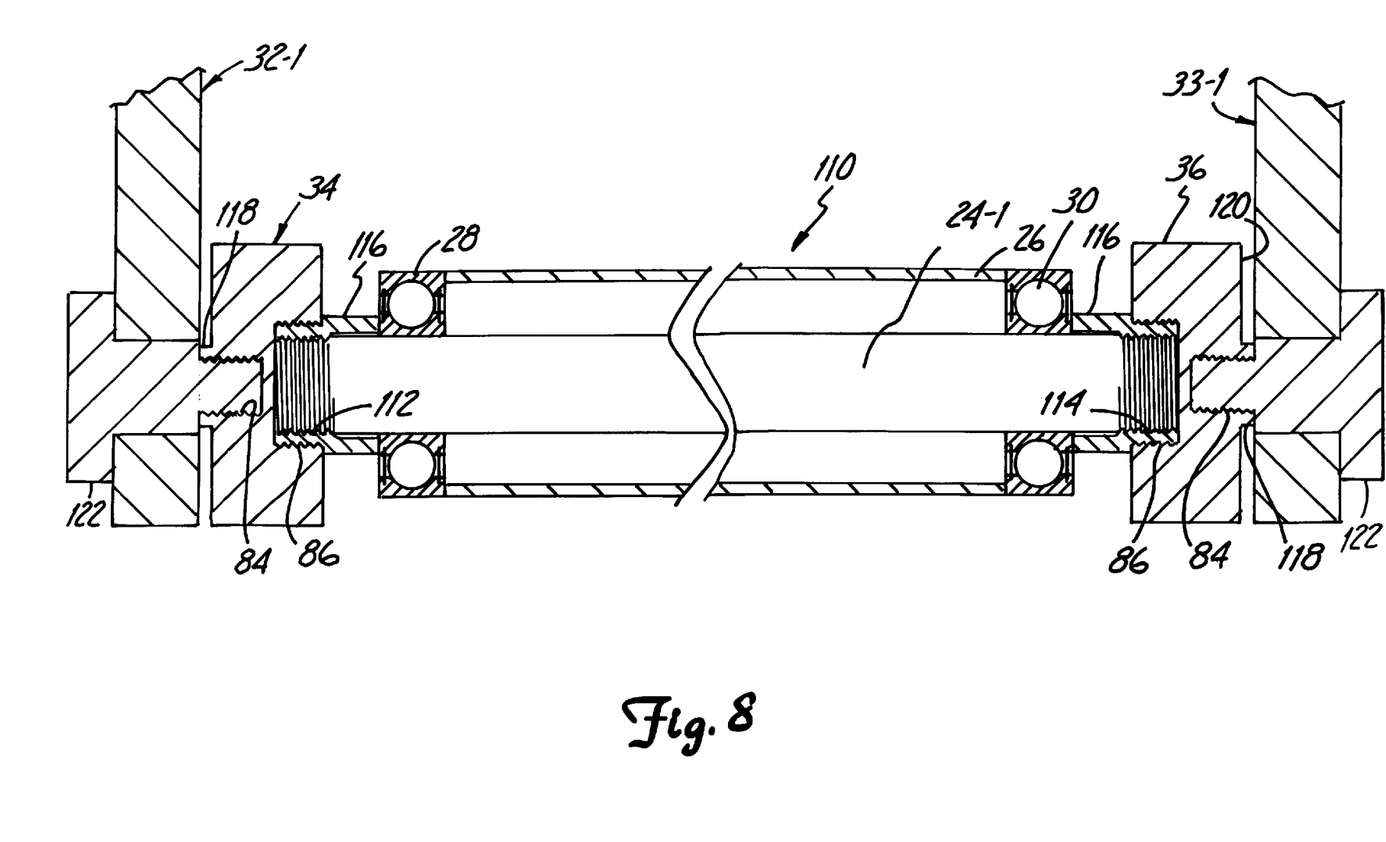
FIG. 8 is an alternate embodiment of a transducer assembly for measuring operating characteristics.

FIG. 8 illustrates an embodiment of a rear wheel assembly 110 incorporating the device of the present invention having symmetric dual triaxial load cells 34, 36 mounted between rods 32-1 and 33-1 where like numbers are used to identify like parts illustrated in FIGS. 2–7. As shown in FIG. 8, stationary rod 24-1 is formed of an elongated cylindrical member having threaded ends 112 and 114. Ends 112 and 114 are coupled to internally threaded bores 86 of load cells 34 and 36 via internally and externally threaded spacer rings 116. Spacer ring 116 provide a rigid support for bearings 28, 30 and wheel hub 26 for transmission of moments to the load cells 34, 36 for measurement. The external threads on rings 116 are threaded into threaded bore 86 of load cells 34, 36 to secure rings 116 to load cells 34, 36 and threaded ends of stationary rod 24-1 are secured to internal threads of rings 116 to secure rod 24-1 to load cells 34, 36.

Figure 9:
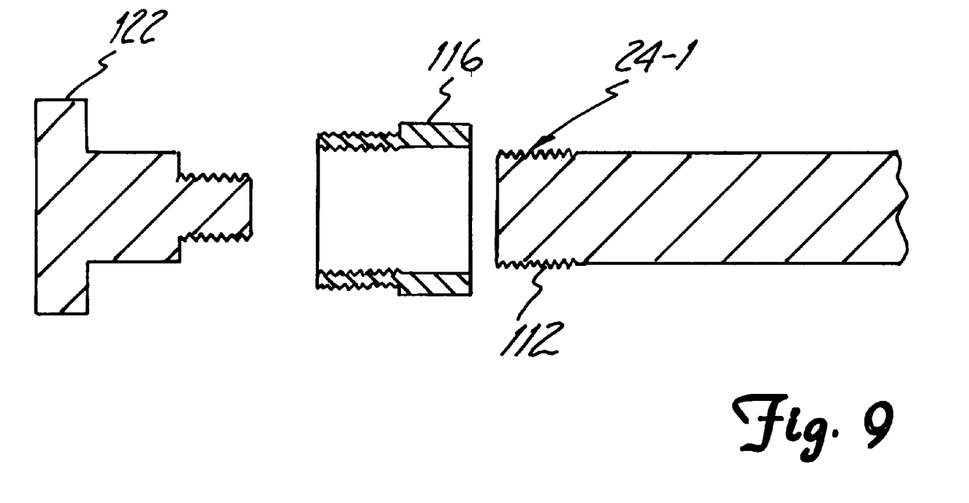
FIG. 9 is an exploded view illustrating components of the transducer assembly of FIG. 7.

As shown in FIG. 8, a housing face of load cells 34 and 36 include a raised center portion 118 or load base. The raised center portion 118 abuts rods 32-1, 33-1 to limit contact of the load cells face with rods 32-1, 33-1. An end bolt 122 couples load cells 34, 36 to rods 32-1, 33-1 via threaded bore 84 at raised center portion 118. Since only the raised center portion 118 abuts rods 32-1, 33-1, the transfer of force is directed through the load cell for measurement and is not balanced by contact of the load cell faces with rods 32-1, 33-1. FIG. 9 is a detailed illustration of bolt 122, spacer rings 116 and threaded elongated shaft forming the stationary rod 24. Thus, the measurement of the dual load cells 34 and 36 is transferred to computer 38 to measure $F_x$, $F_y$ and $F_z$ and the roll and steer moments as previously explained.

Figure 10:
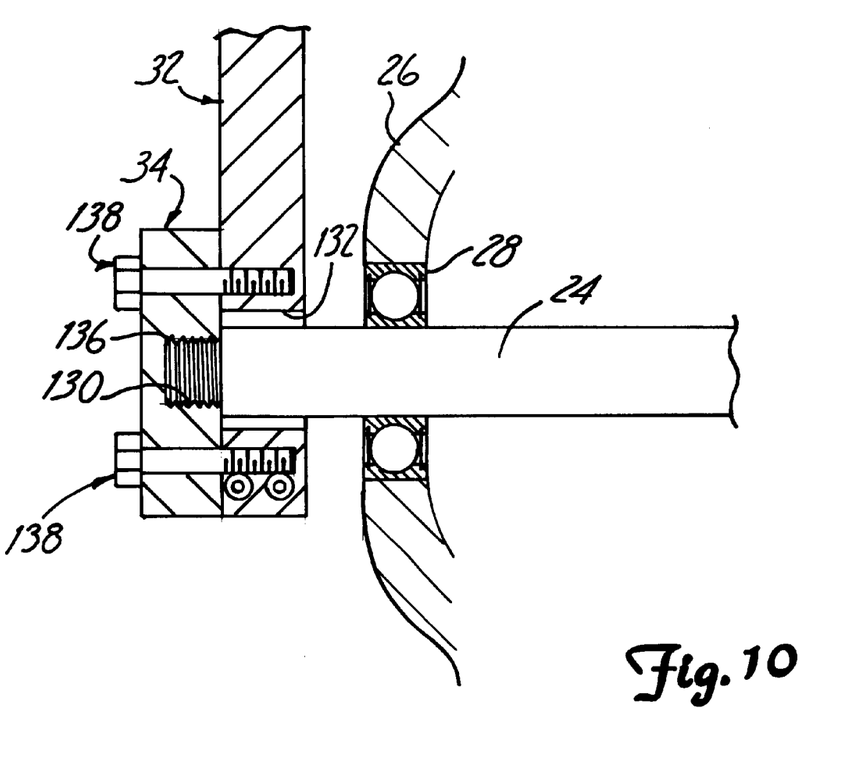
FIG. 10 is a partial view of one side of an embodiment of a transducer assembly of the present invention.

Alternatively, the load cells may be placed on the outside of suspension members or rods 32, 33, as illustrated in the embodiment shown in FIG. 10 where like numbers are used to refer to like parts in the previous FIGS. FIG. 10 is a front elevational view of half of the transducer assembly for simplicity. As shown in FIG. 10, stationary rod 24 includes a threaded end 130. The stationary rod 34 is sized smaller than opening 132 on suspension members 32, 33 and extends therethrough into an internally threaded bore 136 of load cells 34, 36. Stationary rod 24 is connected to load cells 34, 36 via cooperation of threaded end 130 and threaded bore 136 of load cells 34, 36. Load cells 34, 36 are bolted via bolts 138 to suspension members 32, 33 as shown. The opening 132 of fork rods 32, 33 is larger than the dimension of rod 24 to provide sufficient clearance between stationary rod 24 and suspension members 32, 33 so that the path of the force and moments are from the stationary rod 24 through the load cell 34, 36 to the suspension members 32, 33.

In an alternate embodiment, the load cells may be used to calculate brake or drive torque moments. Although, the invention is described with respect to triaxial loads cells 34, 36 which calculate $F_x$, $F_y$ and $F_z$, load cells which calculate a moment in addition to $F_x$, $F_y$ and $F_z$, may be used to measure brake moment. The transducer assembly of the present invention may incorporated as described in a two wheeled vehicle for "on-road" testing. Test data may be collected by an "on-board" computer for later analysis and use. Alternatively, the transducer assembly of the present invention can be incorporated into a simulated test application in a laboratory where simulated test loads are applied and measurement data is collected for analysis and use.

Although particular connection members are shown, it should be understood that various connection screws may be used for securing load cells and shaft to a frame as described. Although, the invention is illustrated with respect to a specific embodiment, it should be understood that the invention is not limited to the specific embodiment shown and may be used on any vehicle, including two wheeled vehicles, such as bicycles.

Although the present invention has been described with reference to preferred embodiments, workers skilled in the art will recognize that changes may be made in form and detail without departing from the spirit and scope of the invention.

What is claimed is:

1. In combination:
   a load axle having an elongated extent extending along an elongated axis and the load axle having opposed first and second ends;
   a wheel hub rotationally connected about an outer circumference of the load axle; and
   first and second spaced load cells having sensing elements enclosed within a housing and a hub having a hub axis coaxially aligned with the elongated axis of the load axle, the first end of the load axle being operably coupled to the hub of the first load cell and the second end of the load axle being operably coupled to the hub of the second load cell to transfer load from the load axle to the load cells to measure the load supplied to the load axle.

2. The combination of claim 1 including opposed spaced vehicle suspension members and the spaced suspension members are operably coupled to the opposed first and second end of the load axle through an intermediate connection with the load cells to transmit the load from the load axle to the suspension members through the first and second load cells.

3. The combination of claim 2 wherein the first and second load cells include opposed first and second hubs and the first end of the load axle is operably coupled to the first hub of the first load cell and the second end of the load axle is operably coupled to the first hub of the second load cell and the opposed spaced suspension members are operably coupled to the second hubs of the first and second load cells to transmit the load imparted to the load axle to the suspension members through the load cells.

4. The combination of claim 2 wherein the load cells include opposed first and second ends, and the first end of the load axle is operably coupled to the hub on the first end of the first load cell and the second end of the load axle is operably coupled to the hub on the first end of the second load cell and the suspension members are operably coupled to the first ends of the load cells to impart the load from the load axle to the suspension members through the load cells in a load path from the load axle through the load cells to the suspension members.

5. The combination of claim 1 including a computer to store measurement data from the first and second load cells.

6. The combination of claim 2 wherein the load cells include opposed first and second ends and the first and second ends of the load axle are operably coupled to the first ends of the load cells and the suspension members are operably coupled to the second ends of the load cells to transmit the load from the load axle to the suspension members through the load cells in a load path from the load axle to the suspension members.

7. The combination of claim 1 wherein the first and second load cells are triaxial load cells.

8. The combination of claim 1 wherein the first and second load cells measure x, y, z-axis forces along an x, y, z axis and including a processor coupled to the first and second load cells to calculate the x, y, z, axis forces along the x, y, z-axis.

9. The combination of claim 1 including a processor operably coupled to the first and second load cells wherein the first and second load cells measure a z-axis force relative to the load axle and the processor calculates an x-axis moment relative to the load axle based upon $M_x=(F_{z2}-F_{z1})R$ where:

$M_x$ is the x-axis moment;

$F_{z2}$ is the z-axis force measured by the second load cell;

$F_{z1}$ is the z-axis force measured by the first load cell; and

R is a distance between the first and second load cells.

10. The combination of claim 1 including a processor operably coupled to the first and second load cells wherein the first and second load cells measure an x-axis force relative to the load axle and the processor calculates a z-axis moment relative to the load axle based upon $M_z=(F_{x1}-F_{x2})R$ where;

$M_z$ is the z-axis moment;

$F_{x1}$ is the x-axis force measured by the first load cell;

$F_{x2}$ is the x-axis force measured by the second load cell; and

R is a distance between the first and second load cells.

11. The combination of claim 4 wherein the suspension members include openings sized for insertion of the load axle therethrough to operably couple to the hubs on the first and second load cells the opening having sufficient clearance for the load axle to decouple the load axle from the suspension members so that the load from the load axle is transferred to the suspension members through the first and second load cells.

12. The combination of claim 2 wherein the first and second load cells include opposed first and second hubs on opposed first and second ends and the load axle is connected to the first hubs on the first ends of the first and second load cells and the suspension members are connected to the second hubs on the second ends of the first and second load cells and the combination including at least one flange proximate to the second hubs on the second ends of the first and second load cells to decouple the suspension members from the load axle to transmit the load from the load axle to the suspension members through the first and second load cells.

13. In combination:

a load axle having an elongated extent extending along an elongated axis and the load axle having opposed first and second ends;

first and second spaced load cells having sensing elements enclosed with a housing and having a hub and the first end of the load axle being operably coupled to the hub of the first load cell and the second end of the load axle being operably coupled to the hub of the second load cell; and first and second suspension members operably coupled to the opposed first and second ends of the load axle through an intermediary connection to the load cells to transmit load from the load axle to the suspension members through the load cells.

14. The combination of claim 13 wherein the first and second load cells include first and second hubs and the first end of the load axle is operably coupled to the first hub of the first load cell and the second end of the load axle is operably coupled to the first hub of the second load cell and the suspension members are operably coupled to the second hubs of the first and second load cells to transmit the load from the load axle to the suspension members through the load cells.

15. The combination of claim 13 wherein the first and second load cells include first and second ends and the first end of the load axle is operably coupled to the hub on the first end of the first load cell and the second end of the load axle is operably coupled to the hub on the first end of the second load cell and the suspension members are operably coupled to the first ends of the load cells to transmit the load from the load axle to the suspension members through the load cells.

16. The combination of claim 13 wherein the load cells are triaxial load cells.

17. The combination of claim 13 wherein the first and second load cells measure x, y, z-axis forces along an x, y, z axis and including a processor coupled to the first and second load cells to calculate the forces along the x, y, z axis.

18. The combination of claim 13 including a processor operably coupled to the first and second load cells wherein the first and second load cells measure a z-axis force relative to the load axle and the processor calculates an x-axis moment relative to the load axle based upon $M_x=(F_{z2}-F_{z1})R$ where:

$M_x$ is the x-axis moment;

$F_{z2}$ is the z-axis force measured by the second load cell;

$F_{z1}$ is the z-axis force measured by the first load cell; and

R is a distance between the first and second load cells.

19. The combination of claim 13 including a processor operably coupled to the first and second load cells wherein the first and second load cells measure a x-axis force relative to the load axle and the processor calculates an z-axis moment relative to the load axle based upon $M_z=(F_{x1}-F_{x2})R$ where:

$M_z$ is the z-axis moment;

$F_{x1}$ is the x-axis force measured by the first load cell;

$F_{x2}$ is the x-axis force measured by the second load cell; and

R is a distance between the first and second load cells.

* * * * *

UNITED STATES PATENT AND TRADEMARK OFFICE
CERTIFICATE OF CORRECTION

PATENT NO. : 6,308,583 B1  
DATED : October 30, 2001  
INVENTOR(S) : Gunness et al.

It is certified that error appears in the above-identified patent and that said Letters Patent is hereby corrected as shown below:

<u>Title page,</u>  
Item [57], ABSTRACT,  
Line 3, "extend" should read -- extent --

<u>Column 3,</u>  
Line 55, "62, 63, 64, 65" should be -- 62,64 --

<u>Column 7,</u>  
Line 27, insert -- , -- after "cells"

Signed and Sealed this

Seventeenth Day of September, 2002

Attest:

JAMES E. ROGAN  
Attesting Officer     *Director of the United States Patent and Trademark Office*